(12) United States Patent
Lamb

(10) Patent No.: US 7,343,733 B2
(45) Date of Patent: Mar. 18, 2008

(54) SYSTEM AND METHOD FOR MONITORING THE EFFICIENCY OF A CATALYST TREATING ENGINE EXHAUST

(75) Inventor: Patrick T. Lamb, Mukwonago, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 141 days.

(21) Appl. No.: 11/236,000

(22) Filed: Sep. 27, 2005

(65) Prior Publication Data

US 2007/0068140 A1    Mar. 29, 2007

(51) Int. Cl.
*F01N 3/00*    (2006.01)
(52) U.S. Cl. ............... 60/274; 60/276; 60/277; 60/285; 60/291; 60/292
(58) Field of Classification Search ............... 60/274, 60/276, 277, 285, 291, 292, 312, 322
See application file for complete search history.

(56) References Cited

U.S. PATENT DOCUMENTS

| | | | |
|---|---|---|---|
| 5,438,827 A * | 8/1995 | Ohuchi et al. ............... 60/276 |
| 6,193,004 B1 | 2/2001 | Cooksey et al. |
| 6,367,245 B1 * | 4/2002 | Yasui et al. ............... 60/277 |
| 6,370,869 B1 * | 4/2002 | Hirota et al. ............... 60/276 |
| 6,386,183 B1 | 5/2002 | Lodise et al. |
| 6,588,259 B2 | 7/2003 | Lodise et al. |
| 6,611,145 B2 | 8/2003 | Lodise et al. |
| 6,637,194 B2 * | 10/2003 | Kakuyama et al. ........... 60/285 |
| 6,711,892 B2 * | 3/2004 | Tamura et al. ............... 60/277 |
| 6,996,974 B2 * | 2/2006 | Anilovich et al. ............ 60/285 |

* cited by examiner

*Primary Examiner*—Binh Q. Tran
(74) *Attorney, Agent, or Firm*—Michael Best & Friedrich LLP

(57) ABSTRACT

A method for monitoring the efficiency of a catalyst includes providing an oxygen sensor between an engine and the catalyst to generate an output signal indicative of oxygen content. The output signal is sampled to provide a first value indicative of the oxygen content of untreated exhaust. The exhaust is allowed to flow through the catalyst to produce treated exhaust and then the treated exhaust is caused to flow back to the oxygen sensor. The output signal is again sampled to provide a second value indicative of the oxygen content of treated exhaust. The second value is compared to the first value to provide an indication of the efficiency of the catalyst.

20 Claims, 3 Drawing Sheets

SYSTEM AND METHOD FOR MONITORING THE EFFICIENCY OF A CATALYST TREATING ENGINE EXHAUST

FIELD OF THE INVENTION

The present invention relates to a system and method for monitoring the efficiency of a catalyst that treats exhaust from an engine, for example, from a motorcycle engine.

BACKGROUND

Catalytic converters have become important components of emission control systems for internal combustion engines. A catalytic converter is used to treat engine exhaust to reduce the amount of undesirable exhaust components released into the air. These undesirable exhaust components include carbon monoxide, hydrocarbons, and nitrogen oxides. A catalytic converter includes one or more catalysts that operate to speed up reactions converting the undesirable components into non-polluting components that are then released into the air, but generally requires relatively high temperatures to be effective. Using an oxidation catalyst, carbon monoxide is combined with oxygen and converted into carbon dioxide, and hydrocarbons are combined with oxygen and converted into carbon dioxide and water molecules. Using a reduction catalyst, nitrogen oxides are converted into nitrogen and oxygen. Generally, the amount of oxygen required for the oxidation reactions is more than that produced by the reduction reactions. Thus, an effective catalytic converter including both types of catalysts reduces the amount of oxygen at its output as compared to its input, as does an effective catalytic converter including only an oxidation catalyst.

Recent governmental regulations promulgated for the purpose of reducing air pollution have targeted motorcycles as well as automobiles. One way to monitor the efficiency of a catalytic converter in automobiles, for example, has been to include an oxygen sensor both upstream and downstream of the catalytic converter. A comparison is made of the output signals of the sensors to ensure that the amount of oxygen is reduced at the downstream sensor.

SUMMARY

The present invention provides a method for monitoring the efficiency of a catalyst. An engine produces exhaust that flows from the engine through an exhaust pipe to the catalyst. The method includes providing an oxygen sensor at a location between the engine and the catalyst to generate an output signal indicative of oxygen content. The output signal is sampled to provide a first value indicative of the oxygen content of untreated exhaust. The exhaust is allowed to flow through the catalyst to produce treated exhaust and then treated exhaust is caused to flow back to the oxygen sensor. The output signal is sampled to provide a second value indicative of the oxygen content of treated exhaust. The second value is compared to the first value to provide an indication of the efficiency of the catalyst.

The present invention also provides an exhaust system for an engine, such as a motorcycle engine. The exhaust system includes an exhaust pipe providing a controlled path for the exhaust from the engine, a catalyst producing treated exhaust, and an oxygen sensor located in the exhaust pipe between the engine and the catalyst and generating an output signal indicative of oxygen content. A flow reversion element causes treated exhaust to flow back to the oxygen sensor. A processor in communication with the oxygen sensor is operable to sample the output signal at selected times. The processor samples the output signal to provide a first value indicative of the oxygen content of untreated exhaust, samples the output signal to provide a second value of the oxygen content of treated exhaust, and compares the first value to the second value to produce an indication of the efficiency of the catalyst.

The present invention also provides a motorcycle including a frame, front and rear wheels coupled to the frame for rotation with respect to the frame, and a two-cylinder engine mounted to the frame. The engine includes first and second cylinders having first and second combustion chambers, respectively, and first and second pistons reciprocating in the first and second cylinders, respectively, and the engine produces exhaust. An exhaust pipe provides a controlled path for the exhaust from the engine, and a catalytic converter including a catalyst produces treated exhaust. An oxygen sensor is located in the exhaust pipe between the engine and the catalyst and generates an output signal indicative of oxygen content. A flow reversion element causes treated exhaust to flow back to the oxygen sensor. A processor in communication with the oxygen sensor is operable to sample the output signal at selected times. The processor samples the output signal to provide a first value indicative of the oxygen content of untreated exhaust, samples the output signal to provide a second value of the oxygen content of treated exhaust, and compares the first value to the second value to produce an indication of the efficiency of the catalyst.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION OF THE DRAWINGS

Figure 1:
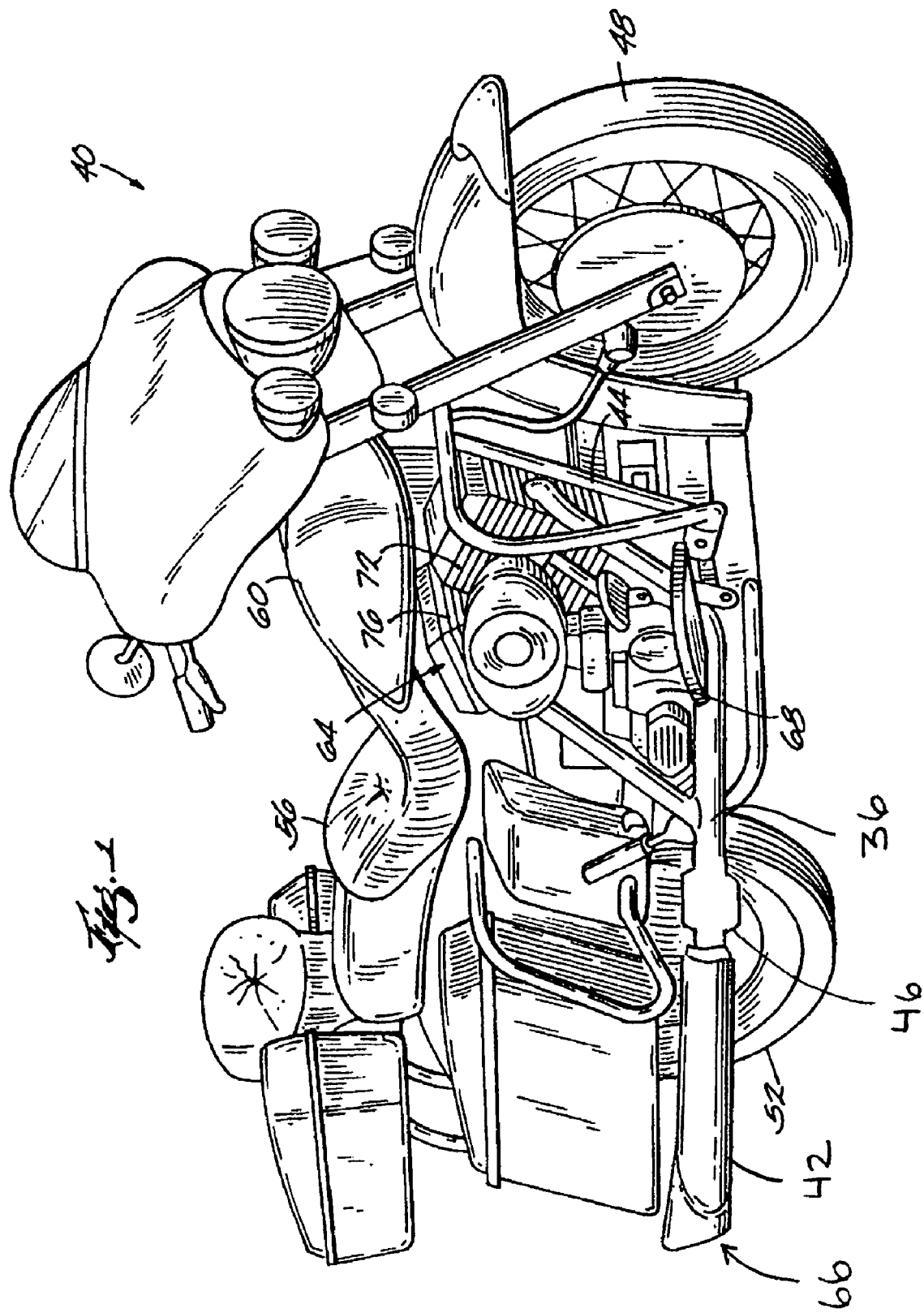
FIG. 1 is a side elevational view of a motorcycle embodying the present invention.

FIG. 1 illustrates a motorcycle 40 including a frame 44, front and rear wheels 48, 52, a seat 56, a fuel tank 60, an engine 64, and an exhaust system 66. The front and rear wheels 48, 52 rotate with respect to the frame 44 and support the frame 44 above the ground. The engine 64 is mounted to the frame 44 and drives the rear wheel 52 through a transmission 68 and drive belt (not shown). The seat 56 and fuel tank 60 are also mounted to the frame 44.

Figure 2:
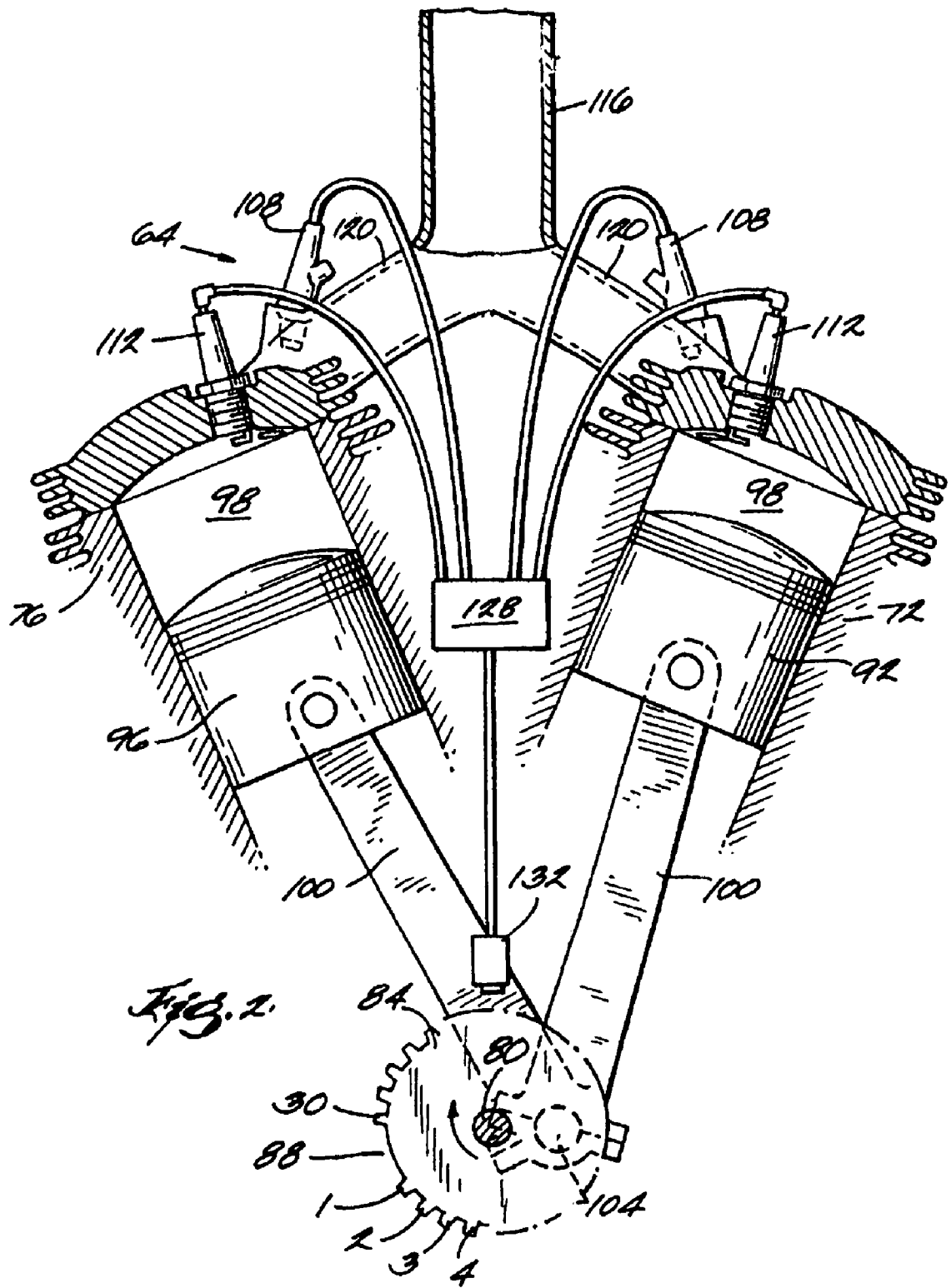
FIG. 2 is a schematic representation of a portion of the engine of the motorcycle illustrated in FIG. 1.

As schematically shown in FIG. 2, the illustrated engine 64 is a V-type two-cylinder four-stroke engine including first and second cylinders 72, 76. The first and second cylinders 72, 76 include respective first and second pistons 92, 96, each connected to a crankshaft 80 with a respective connecting rod 100. The first and second cylinders 72, 76 also have respective combustion chambers 98. The illustrated crankshaft 80 has a single crankpin 104 to which both of the connecting rods 100 are attached. The engine 64 also includes a fuel injector 108 and spark plug 112 for each cylinder 72, 76, and an air intake manifold 116 communicating with the two cylinders 72, 76 through a splitter or dual runner 120. The pistons 92, 96 reciprocate within the cylinders 72, 76 in a four stroke (four phase) combustion cycle to rotate the crankshaft 80. The four strokes or phases include intake, compression, expansion, and exhaust. As is well known in the art, the crankshaft 80 rotates twice for each four stroke cycle of the engine 64. The pistons 92, 96 reach top-dead-center (TDC) and bottom-dead-center twice for each cycle. For example, when piston 92 reaches TDC, that piston 96 is at the end of either the compression or exhaust phase or stroke of the cycle.

The crankshaft 80 includes a crank gear 84 mounted thereto for rotation therewith. Although the illustrated crank gear 84 includes teeth that are sized and spaced to allow for thirty-two teeth around the circumference of the crank gear 84, only thirty teeth (1, 2, 3, 4, . . . , 30) are provided, with the two missing teeth providing a reference point 88 for determining the rotational speed of the crankshaft 80. Specifically, a crankshaft velocity sensor in the form of a crank gear sensor 132, which is preferably a variable reluctance sensor, is mounted on the engine near the crank gear 84 and communicates with a processor 128, preferably through a wire. The crank gear sensor 132 senses when a gear tooth is moved past it. The processor 128 is programmed to measure the rotational speed of the crankshaft 80 at selected times during the crankshaft rotation. Based on the measured crankshaft speeds, the processor 128 determines the phase of the engine. Methods for programming the processor 128 to determine the phase of the engine using this setup are known, and one such method is described in U.S. Pat. No. 6,588,259, hereby incorporated by reference.

The exhaust system 66 carries the products of combustion, i.e., the exhaust, away from the combustion chambers 98 of the engine 64 during the engine exhaust phase. The exhaust exiting the engine 64 is in the form of a gas under high pressure.

Figure 3:
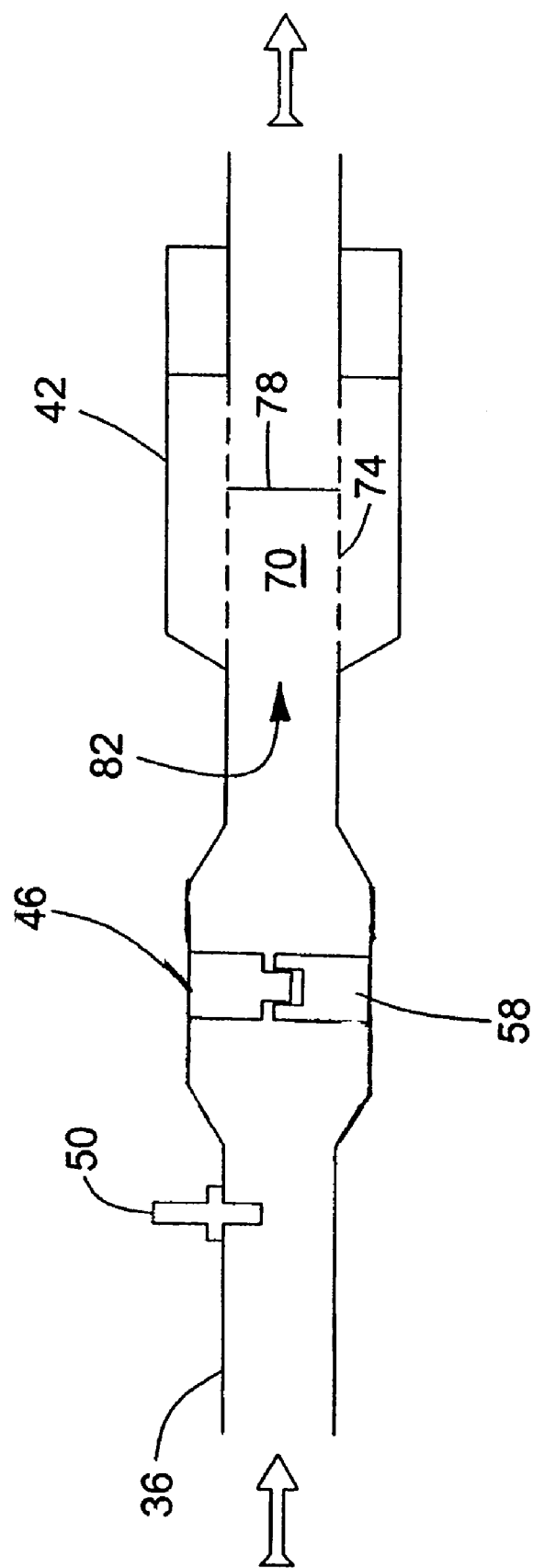
FIG. 3 is a schematic cross section view of a portion of the exhaust system of the motorcycle illustrated in FIG. 1.

In one embodiment, the exhaust system 66 includes an exhaust pipe 36 in fluid flow communication with the combustion chambers 98 of the first and second cylinders 72, 76 respectively and provides a controlled path for the downstream flow of exhaust from the engine 64. The exhaust pipe 36 extends down from the engine 64 and rearwardly with respect to the motorcycle 40. The exhaust system 66 also includes a muffler 42 to provide a controlled path for the flow of the exhaust to reduce noise emitted from the engine 64 during operation. Further, as schematically illustrated in FIG. 3, the exhaust system 66 also includes a catalytic converter 46 and a single oxygen sensor 50.

Other embodiments of the exhaust system 66 may include two separate exhaust pipes, two mufflers, and two catalytic converters, which would necessitate using two oxygen sensors. In that case, a single oxygen sensor is associated with each catalytic converter.

In one embodiment, the catalytic converter 46 is located close to the muffler 42, preferably within a foot or so of the muffler. Additionally, the oxygen sensor 50 is mounted between the engine 64 and the catalytic converter 46, preferably within inches of the catalytic converter 46.

In one embodiment, the catalytic converter 46 includes a catalyst 58, such as a three-way catalyst that performs both oxidation and reduction reactions. In other embodiments, the catalytic converter 46 can include other types of catalysts, such as one that performs only oxidation. The catalytic converter 46 operates to treat the exhaust from the engine 64 to produce treated exhaust. In particular, untreated exhaust from the engine 64 includes undesirable components such as carbon monoxide, various hydrocarbons and various nitrogen oxides. When working effectively, the catalyst 58 speeds up reactions to convert most of these undesirable components of the exhaust into desirable components such as carbon dioxide, water, and nitrogen.

Provided that the catalyst 58 is working effectively, the oxidation and reduction reactions result in a net loss of oxygen from the untreated exhaust to the treated exhaust. Using an oxidation catalyst also results in a net loss of oxygen. Therefore, monitoring the amount of oxygen in the treated exhaust and comparing it to the amount of oxygen in the untreated exhaust provides an indication of the efficiency of one or more catalysts in the catalytic converter 46.

The oxygen sensor 50 is also coupled to the processor 128, for example, with a wire (not shown). The oxygen sensor 50 provides an output signal indicative of the oxygen content of the exhaust in the exhaust pipe 36 near the catalytic converter 46. In one embodiment, the oxygen sensor 50 provides an electronic output signal in the form of a varying voltage signal that is communicated to the processor 128. As more fully explained below, the processor 128 is programmed to monitor the output signal from the oxygen sensor 50 and compare the amount of oxygen in the treated exhaust to the amount of oxygen in the untreated exhaust and provide an indication thereof.

A flow reversion element of the exhaust system 66 causes treated exhaust flowing from the catalyst 58 to flow back to the oxygen sensor 50 at certain times in the engine's combustion cycle. In one embodiment, the flow reversion element is a restriction 70 in the muffler 42 that creates back pressure. For example, restriction 70 in muffler 42 is caused by a perforated tube 74 and a baffle 78 mounted in the tube 74. Treated exhaust from the catalytic converter 46 enters the muffler 42 at a specific point in the combustion cycle (e.g., during the intake stroke) and exhaust flow reversion occurs in the muffler 42 due to a pressure wave created by the restriction 70. In other words, when the pressure at the restriction 70 is higher than the pressure at the inlet 82 of the muffler 42, the flow of the treated exhaust will change direction at or near the muffler inlet 82. Because the catalyst 58 is located near the muffler inlet 82 and the oxygen sensor 50 is located in close proximity to the front of the catalytic converter 46, this flow reversal will allow measurement of the oxygen content of the treated exhaust (i.e., the exhaust that has undergone catalysis).

In particular, the exhaust system 66 operates as follows. The oxygen sensor 50 provides an output signal indicative of the gas within the vicinity of the oxygen sensor 50. As the exhaust flows from the engine 64 through the exhaust pipe 36 to the catalytic converter 46 after the beginning of a particular exhaust stroke, the processor 128 samples the output signal of the oxygen sensor to provide a first value indicative of the oxygen content of this untreated exhaust. In particular, the first value could be obtained from a sampled value of the output signal at a single point in time, or the first value could be computed from multiple sample values at multiple points in time. For example, the first value could be an average of multiple sample values representing different points in time.

The exhaust from the particular exhaust stroke then flows through the catalytic converter 46 and undergoes catalysis. As the treated exhaust flows to the muffler 42, it undergoes flow reversion. Flow reversion occurs after the end of the particular exhaust stroke and causes a portion of the treated exhaust to flow back through the catalytic converter 46 and to the vicinity of the oxygen sensor 50. The processor 128 again samples the output signal of the oxygen sensor 50 to provide a second value indicative of the oxygen content of the treated exhaust. The first value is compared to the second value to provide an indication of the efficiency of the catalytic converter 46.

In one embodiment, the sampling times of the processor 128 are linked to engine conditions such as the phase of the engine, such as can be determined by known methods previously described. For example, knowing when the engine 64 has begun an exhaust stroke, and having information relating to the timing between the beginning of an exhaust stroke and when the untreated exhaust reaches the oxygen sensor 50 allows the processor 128 to sample the output signal of the oxygen sensor 50 at the appropriate times to determine a value indicative of the oxygen content of the untreated exhaust. This timing will depend on the dimensions of the exhaust pipe 36, the location of the oxygen sensor 50, and other engine conditions, and can be empirically determined for different dimensions and conditions. Similarly, the reversion time measured from the first sampling time can also be determined, in order that the processor 128 can sample the output signal of the oxygen sensor 50 at the appropriate time to determine a value indicative of the treated exhaust. The processor 128 can then compare the first value to the second value and provide and indication of the comparison. For example, if the second value is not less than the first value, i.e., the oxygen content has not decreased, then the processor 128 can produce necessary signals to turn on a warning light or the like.

In another embodiment, the output signal is sampled at a plurality of times and digital signal processing techniques are used to determine which sampled values correspond to untreated exhaust, and which sampled values correspond to treated exhaust.

A baffle (not shown) in the exhaust pipe 36 after the catalytic converter 46 that is not part of a muffler could also be used as a flow reversion element.

The described exhaust system and method is advantageous in that a single oxygen sensor 50 can be used to monitor the efficiency of an associated catalyst, thereby reducing system costs and improving the stylistic appearance of the motorcycle 40, since an oxygen sensor 50 near the muffler and additional necessary connection to the processor 128 are not required.

Although the invention has been described in detail with reference to certain preferred embodiments, variations and modifications exist within the scope and spirit of the invention as described and defined in the following claims.

What is claimed is:

1. A method for monitoring the efficiency of a catalyst in an exhaust system for an engine that produces exhaust that flows from the engine through an exhaust pipe to the catalyst, the method comprising:
   providing an oxygen sensor at a location between the engine and the catalyst to generate an output signal indicative of oxygen content;
   sampling the output signal to provide a first value indicative of the oxygen content of untreated exhaust;
   allowing the exhaust to flow through the catalyst to produce treated exhaust and then causing treated exhaust to flow back to the oxygen sensor;
   sampling the output signal to provide a second value indicative of the oxygen content of treated exhaust; and
   comparing the second value to the first value to provide an indication of the efficiency of the catalyst.

2. The method of claim 1, wherein a muffler is located after the catalyst and a restriction in the muffler causes treated exhaust to flow back through the catalyst to the oxygen sensor.

3. The method of claim 1, wherein a processor performs the sampling and comparing steps.

4. The method of claim 1, wherein each sampling step occurs at a single point in time.

5. The method of claim 1, wherein the first value is computed from sampling the untreated exhaust at multiple points in time.

6. The method of claim 1, wherein the second value is computed from sampling the treated exhaust at multiple points in time.

7. The method of claim 1, wherein a processor performs the sampling steps at times related to engine conditions.

8. The method of claim 7, wherein the engine conditions include phases of the engine.

9. An exhaust system for an engine producing exhaust, the system comprising:
   an exhaust pipe providing a controlled path for the exhaust from the engine;
   a catalytic converter including a catalyst producing treated exhaust;
   an oxygen sensor located between the engine and the catalyst and generating an output signal indicative of oxygen content of gas in the exhaust pipe;
   a flow reversion element causing treated exhaust to flow back to the oxygen sensor; and
   a processor in communication with the oxygen sensor, wherein the processor is operable to sample the output signal to provide a first value indicative of the oxygen content of untreated exhaust, is operable to sample the output signal to provide a second value indicative of the oxygen content of treated exhaust, and is operable to compare the first value to the second value to produce an indication of the efficiency of the catalyst.

10. The exhaust system of claim 9, wherein a single oxygen sensor is associated with the catalytic converter.

11. The exhaust system of claim 9, wherein the flow reversion element is a restriction-type muffler.

12. The exhaust system of claim 9, wherein the flow reversion element causes the treated exhaust to flow back through the catalyst.

13. The exhaust system of claim 9, wherein the processor samples the output signal at one of a single point in time and multiple points in time to provide the first value.

14. The exhaust system of claim 9, wherein the processor samples the output signal at one of a single point in time and multiple points in time to provide the second value.

15. A motorcycle comprising:
   a frame;
   front and rear wheels coupled to the frame for rotation with respect to the frame;
   a two-cylinder engine mounted to the frame and including first and second cylinders having first and second combustion chambers, respectively, and first and second pistons reciprocating in the first and second cylinders, respectively, the engine producing exhaust,
an exhaust pipe providing a controlled path for the exhaust from the engine;
a catalytic converter including a catalyst producing treated exhaust;
an oxygen sensor located in the exhaust pipe between the engine and the catalyst and generating an output signal indicative of oxygen content;
a flow reversion element causing treated exhaust to flow back to the oxygen sensor; and
a processor in communication with the oxygen sensor, wherein the processor is operable to sample the output signal to provide a first value indicative of the oxygen content of untreated exhaust, is operable to sample the output signal to provide a second value indicative of the oxygen content of treated exhaust, and is operable to compare the first value to the second value to produce an indication of the efficiency of the catalyst.

16. The motorcycle of claim 15, wherein a single oxygen sensor is associated with the catalytic converter.

17. The motorcycle of claim 15, wherein the flow reversion element is a restriction-type muffler.

18. The motorcycle of claim 15, wherein the flow reversion element causes the treated exhaust to flow back through the catalyst.

19. The motorcycle of claim 15, wherein the processor samples the output signal at one of a single point in time and multiple points in time to provide the first value.

20. The motorcycle of claim 15, wherein the processor samples the output signal at one of a single point in time and multiple points in time to provide the second value.

* * * * *